United States Patent [19]

Mitchell

[11] 4,236,311
[45] Dec. 2, 1980

[54] VEGETATION CUTTING APPARATUS

[75] Inventor: Albert W. Mitchell, Houston, Tex.

[73] Assignee: Emerson Electric Company, St. Louis, Mich.

[21] Appl. No.: 1,109

[22] Filed: Jan. 5, 1979

Related U.S. Application Data

[63] Continuation-in-part of Ser. No. 802,211, May 31, 1977, abandoned.

[51] Int. Cl.³ .............................................. A01D 50/00
[52] U.S. Cl. ........................................ 30/276; 56/12.7
[58] Field of Search ................... 30/276, 347; 56/12.7; 51/335, 359

[56] References Cited

U.S. PATENT DOCUMENTS

| | | | |
|---|---|---|---|
| 2,709,323 | 5/1955 | Swan | 51/335 |
| 2,771,721 | 11/1956 | Reiman | 51/335 |
| 2,854,798 | 10/1958 | De Haven | 51/335 |
| 3,708,967 | 1/1973 | Geist et al. | 56/12.7 |
| 4,047,299 | 9/1977 | Bair | 30/276 |
| 4,134,204 | 1/1979 | Perdue | 30/276 |

FOREIGN PATENT DOCUMENTS 1502459  4/1970  Fed. Rep. of Germany ............ 51/359

*Primary Examiner*—Jimmy C. Peters

[57] ABSTRACT

An apparatus for cutting vegetation has a rotating disc-like head with a drive connection on one face and a second face having a smooth surface. The head carries internally a spool mounted for independent rotation. A flexible, non-metallic cutting line is coiled about the spool and has a free end extending outwardly from the head into a cutting plane. A button member within the smooth surface activates a locking means allowing the spool to rotate in the head and extend a certain length of cutting line into the cutting plane. Then the spool is secured automatically against rotation to the head.

17 Claims, 7 Drawing Figures

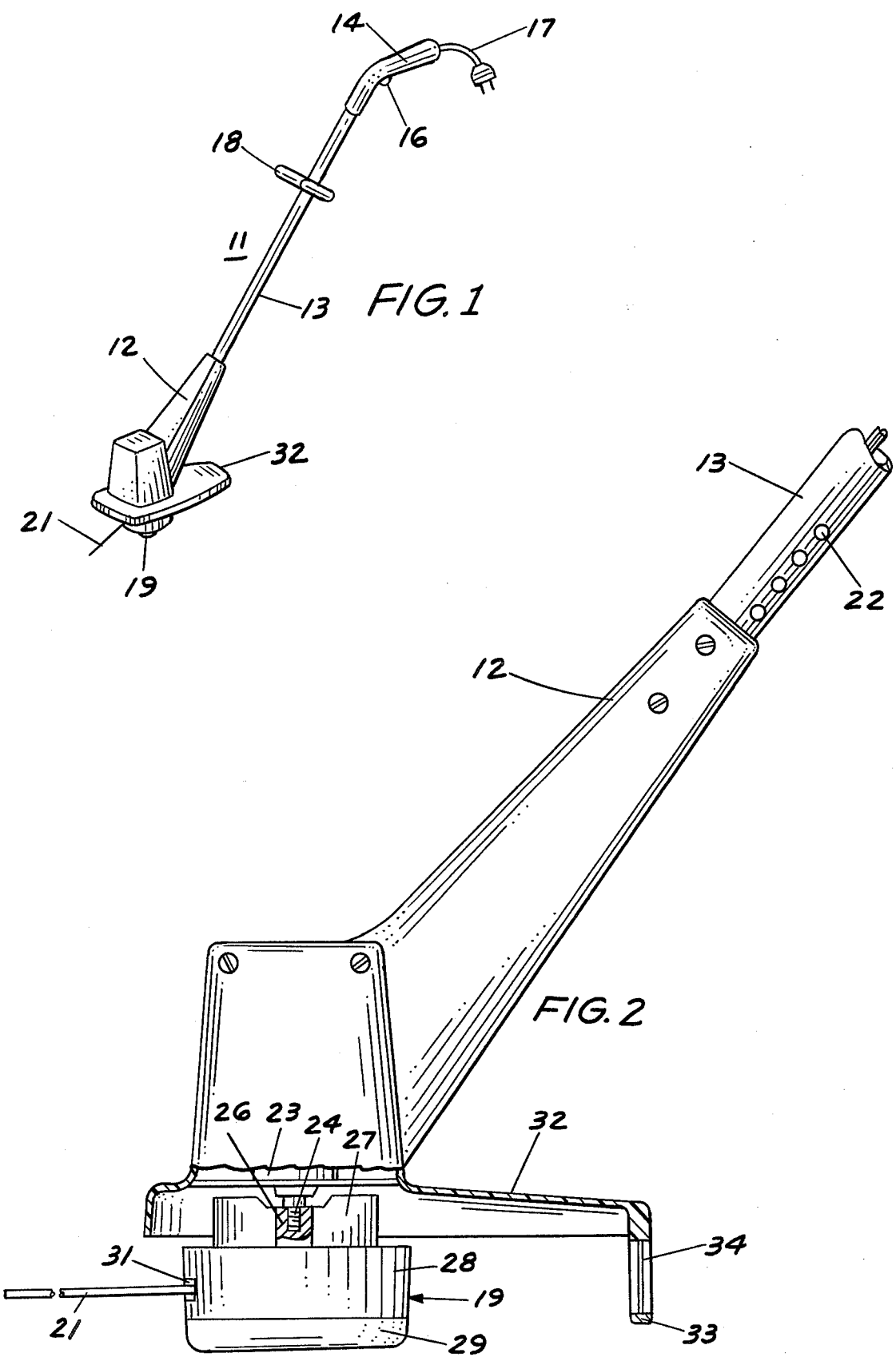

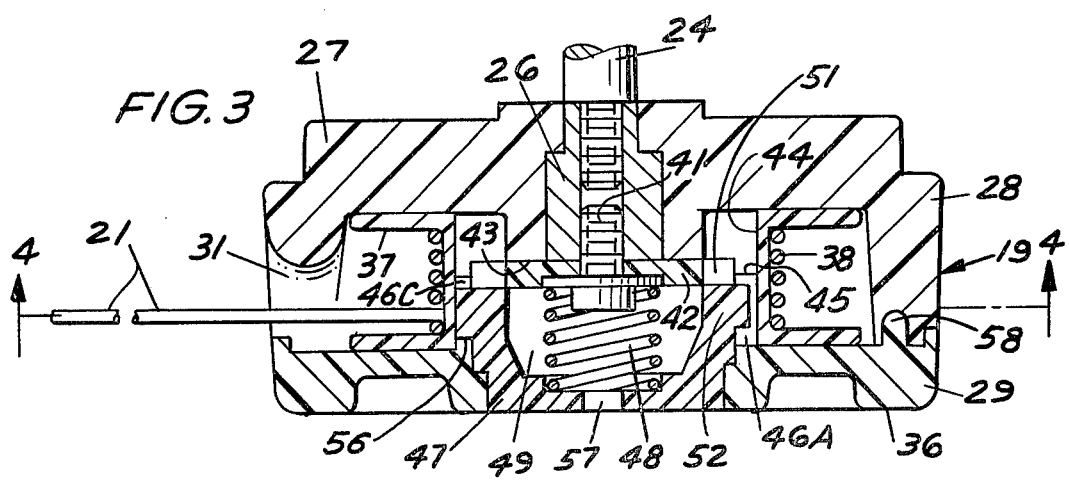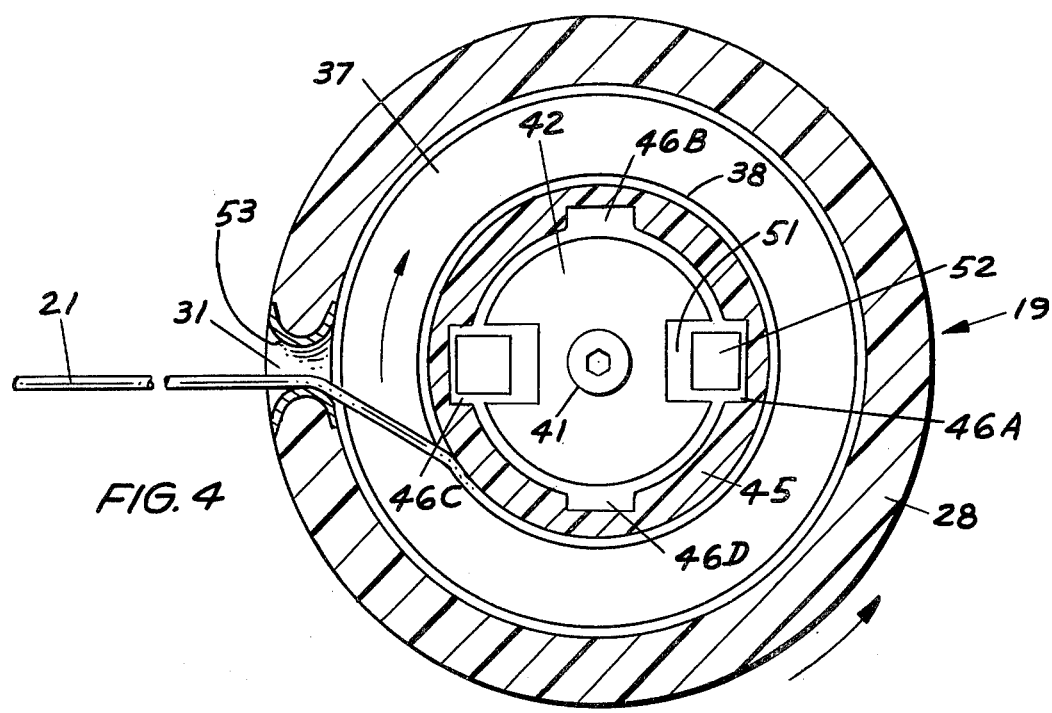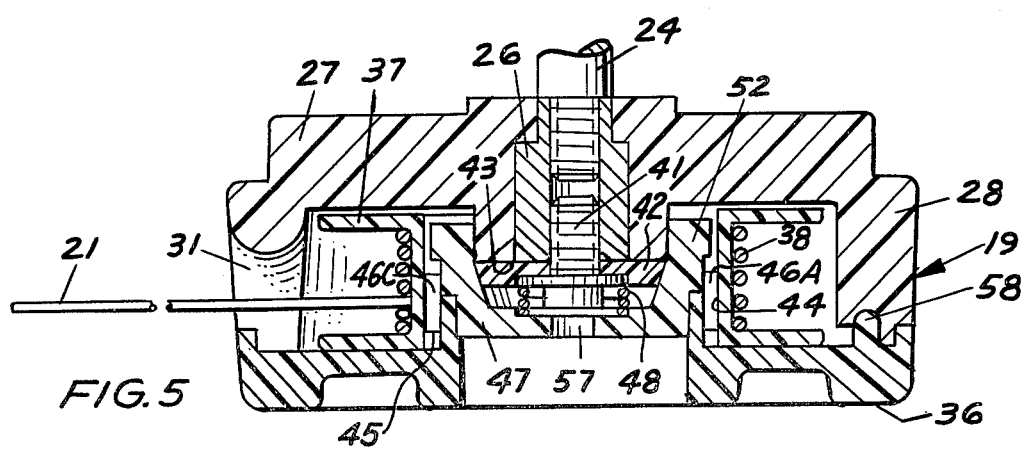

VEGETATION CUTTING APPARATUS

This application is a continuation-in-part of application Ser. No. 802,211 filed May 31, 1977, now abandoned.

BACKGROUND OF THE INVENTION

1. Field of the Invention

This invention relates to the cutting of vegetation, and more particularly, it relates to the cutting of vegetation using a flexible, non-metallic cutting line extending from a rotating head into a cutting plane.

2. Description of Prior Art

Various types of devices have been proposed for many years to facilitate the removal of vegetation by mowing, trimming, edging and like operations. In general, these devices have employed a metal blade to effect vegetation removal. Devices of this nature employ power movers such as electric and gasoline motors. As a result, rotating metal blades can inflict serious and terrible injury upon the user.

In about 1960, there was developed in Europe a trimmer-edger unit employing a flexible polymeric line extending from a rotating head for cutting vegetation. This unit did not work properly because of several defects in structure and operating parameters. In the United States of America, practical vegetation cutting devices using flexible, non-metallic lines carried upon a rotating head were developed. The devices are shown in U.S. Pat. Nos. 3,708,967, 3,826,068, and 3,859,776. These patented devices have met outstanding success in the worldwide marketplace. One reason for this success is that these American developments are probably the safest electrical or gasoline-powered tools yet invented for vegetation cutting, edging and trimming operations.

The devices shown in these patents employ a flexible cutting line, such as manufactured from Nylon ® polymer. The cutting line is carried upon a spool internally of a rotating head. When desired to replenish the line or to extend an additional length of it, the rotation of the head was stopped and line manually extended from the head by either (1) uncoiling directly from the head; or (2) unlocking an internal spool, pulling the line from the head to the desired length and releasing the locking mechanism so that the spool was again secured against rotation in the head. These structures in the patented devices have been found to be convenient, simple and reliable. In many of the smaller devices, especially those powered by electric motors, a simpler system to extend the cutting line from the head was desired. The present invention is a device for cutting vegetation in the nature of the patented devices, wherein a simple but reliable mechanism is employed for extending selectively the cutting line in a certain length from the head. More particularly, this novel device or apparatus is simple to operate and has no complicated mechanisms. A button member on the head is depressed when the head is in a non-rotating condition. Then, the line can be pulled from an internal spool released for rotation in the head, until a certain length is withdrawn. Now, the spool is re-locked to the head. The line may be pulled manually by the user from the head. Alternatively, the head can be rotated to pull the line from the head by centrifugal force. Other features of the present invention will be apparent from the following description.

SUMMARY OF THE INVENTION

In accordance with this invention, there is provided a novel apparatus for cutting vegetation. A planar head on the apparatus is rotatable about an axis of rotation with a drive connection extending from a first face and a second face having a smooth surface free of projections and recesses capable of trapping appreciable vegetation. The head carries a spool mounted for independent rotation. A flexible, non-metallic cutting line has a first end extending radially outwardly from the head into a cutting plane residing substantially perpendicular to the axis of rotation of the head. A second end of the cutting line is secured to the spool with a supply of the cutting line coiled about it. Locking means on the head are adjusted between first and second positions by an actutating member carried on the second face. In a first position, the locking means secure the spool against rotation relative to the head. In a second position, the locking means release the spool to rotate and extend a certain length of cutting line from the head into the cutting plane. At that occurrence, the locking means return to the first position and secure the spool against rotation within the head.

DESCRIPTION OF THE DRAWINGS

FIG. 1 is a pictorial view illustrating one embodiment of the apparatus for cutting vegetation arranged according to the present invention;

FIG. 2 illustrates in enlargement the lower portion of the apparatus shown in FIG. 1;

FIG. 3 is a vertical section, in enlargement, taken through the head of the apparatus shown in FIG. 2;

FIG. 4 is a horizontal cross-section of the head shown in FIG. 3 taken along line 4—4;

FIG. 5 is the section of FIG. 3, but with the actuating member depressed inwardly to extended cutting line from the head;

DESCRIPTION OF SPECIFIC EMBODIMENTS

Figure 6:
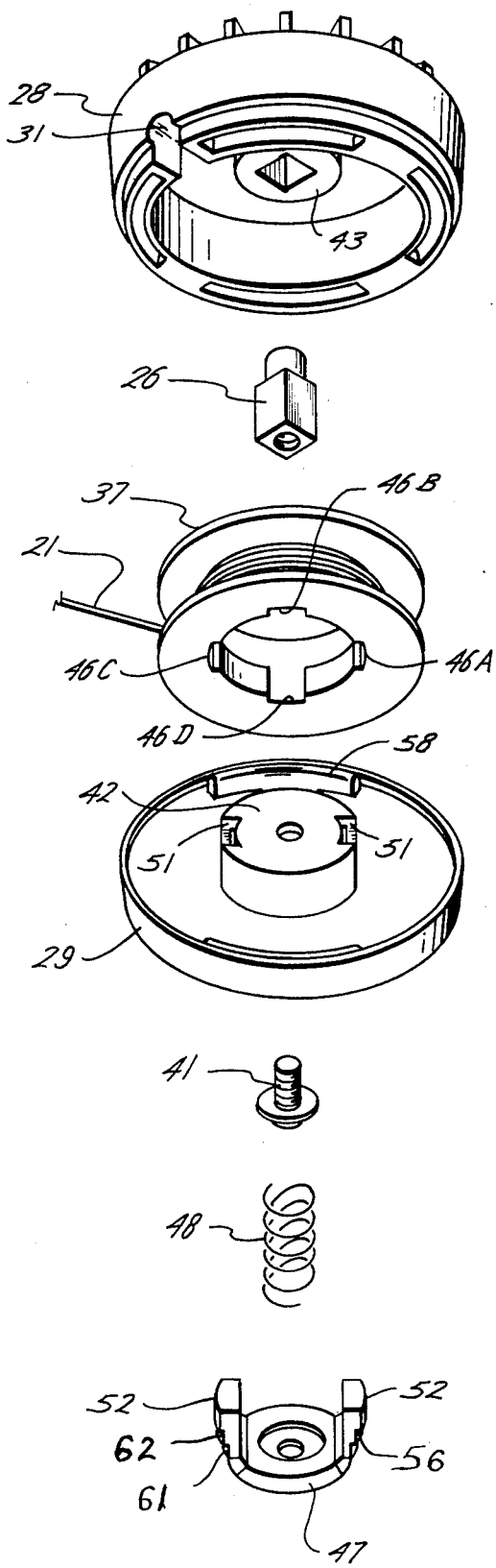
FIG. 6 is a view in dissasembly of the head of FIG. 3.

Referring to FIG. 1, there is shown an apparatus for cutting vegetation, which is constructed in accordance with one embodiment of the present invention. In this particular embodiment, the apparatus is a grass trimmer 11, but it could be a lawnmower, edger or other device for vegetation cutting purposes. The trimmer 11 has a lower housing 12 interconnected by a tube 13 to a handle assembly 14. The assembly 14 provides a switch 16 for selectively applying electrical power received by a cord 17 to an electrical motor carried within the housing 12. For two-handed operation of the trimmer 11, an auxiliary handle 18 is provided upon the tube 13. The lower housing 12 carries a rotatable head 19 from which extends at least one length of a flexible, non-metallic cutting line 21. Rotation of the head 19 about an axis passing through the housing 12 extends the cutting line 21 into a cutting plane which is substantially perpendicular to the axis of rotation of the head.

In FIG. 2, there is shown an enlargement of the housing 12 with a portion of the tubing 13 carrying a plurality of air induction openings 22. These openings introduce a flow of cooling air over the prime mover contained in the housing 12. In the particular embodiment being described, the housing 12 includes an electric motor 23 which has a downwardly extending drive shaft 24. The head 19 is threadedly connected to the shaft 29 by a metal adaptor 26. The adaptor 26 extends from the upper face of the head 19 surrounded by a plurality of vanes 27 serving as a centrifugal blower for moving air radially outwardly from the head 19 during its rotation. As a result, the induced flow of air cools the motor 23 within the housing 12. The head 19 is formed of a hub 28 and a lower cover 29. The cover 29 is secured to the hub 28 in any convenient fashion. The hub 28 carries in its side peripheral surface an aperture 31 through which the cutting line 21 extends radially outwardly.

The housing 12 includes a rearwardly extending tail part 32 which serves as a protection to the user to prevent inadvertent contact with the rotating cutting line 21. Also, the tail part provides an automatic limit to the extension of the cutting line 21 from the head 19. More particularly, the tail part 32 has a downwardly extending projection 33 in which is embedded a metal cutting blade 34. As a result, the cutting line 21 rotated by the head 19 can never have an operating length greater than the distance from the axis of rotation to the cutting blade 34, since any greater length will automatically be severed.

Referring now to FIG. 3, the head 19 preferably has a lower surface 36 on the cover 29 which is smooth and substantially free of projections and recesses capable of trapping appreciable vegetation. Stated in another manner, all parts of the surface 36 are unbroken along their line of travel during rotation of the head 19, although they may be multi-planar on a radially extending line from the axis of rotation. In this manner, these surfaces slide over vegetation without cutting or accumulating debris on the lower surface 36 of the head 19. One end of the cutting line 21 extends from the head 19 through the aperture 31. The other end of the cutting line is secured to a spool 37 which is mounted for independent rotation within the head 19. Preferably, the spool 37 is of the reel type and is mounted concentrically within the head 19. A supply of the cutting line is carried upon the spool 37 in a plurality of coils 38. The spool 37 is locked selectively to the head 19 and rotates with it. As a result, the cutting line 21 cannot be withdrawn unintentionally, either manually or by rotation of the head 19 during cutting of vegetation.

The head 19 carries a locking system so that the spool 37 can be selectively released for independent rotation within the head 19. Preferably, this function is arranged to be induced only when the head 19 is in a non-rotating condition. More particularly, the lower cover 29 is held concentrically to the hub 28 by a cap screw 41 threaded into the adapter 26. The cover 29 has a cup-like depression extending axially from the surface 36. An abutting wall 42 formed in the cover 29 is engaged between the screw 41 and the presented surfaces 43 of the hub 28. The locking system on the head 19 may comprise a plurality of projections and recesses forming an escapement which limits the rotation of the spool 37 to a predetermined angular displacement within the head 19. It will be apparent that there are a variety of mechanical elements capable of performing the escapement function. In the embodiment illustrated in the drawings, especially in FIG. 6, the spool 37 carries on its interior surface 44 a plurality of recesses or grooves 46A, 46B, 46C and 46D at 90-degree angular displacements. These grooves extend through rim portion 45 and only partially the axial length of the spool 37. For example, the rim portion 45 in the spool 37 extends only one-half the thickness of the spool 37 within the head 19. An actuating or button member 47 is mounted for axial movement within the head 19 from an outward position as is shown in FIG. 3, to an inward position illustrated in FIG. 5. A spring 48 is contained within a cavity 49 formed between the button member 47 and the wall 42 of the cover 29. The spring 48 serves to bias the button member 47 in the outward station. In addition, the wall 42 is provided with openings 51 through which pass the lugs 52 of the button member 47. In particular, the lugs 52 are received within the grooves of the spool 37 when the button member 47 is held in its outward station by the spring 48. In this condition, the button member locks in a first position, securing the spool 37 to the head 19 with the lugs 52. As a result, the cutting line 29 cannot be withdrawn unintentionally from the head, either manually or during use in cutting vegetation.

The particular arrangement of the locking mechanism with the button member in the first station can be appreciated in reference to FIG. 4. The lugs 52 are received within the grooves 46A and 46C carried on the spool 37 and also within the upper portion of the opening 51 of the cover 29. In this manner, the spool 37 is locked through the lugs 52 to the head 19. Although only one lug 52 may be employed, it is preferred for symmetry and smoother operation to employ a pair of the lugs equally spaced about the button member 47. For purpose of 90-degree angular displacements, the spool 37 is provided with a plurality of uniformly spaced grooves which are designated 46A, 46B, 46C and 46D. Rotation of the spool 37 in the head 19 at equal angular displacements feeds the cutting line 21 through the aperture 31 in successive predetermined lengths. Preferably, the side surfaces of the aperture 31 are covered with a metal bearing surface 53. The cutting line 21 slides relatively friction-free over the metal bearing surface 53.

Figure 7:
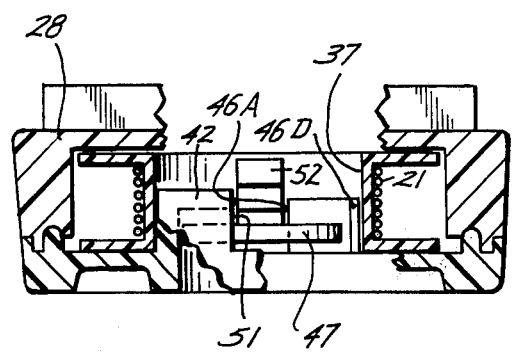
FIG. 7 is a section like FIG. 5 but with the head rotated angularly by 90-degrees.

Referring now to FIGS. 5 and 7, the button member 47 is shown as being depressed axially to the inward position within the head 19. At this time, the lugs 52 have passed through the openings 51 in the lower wall 42 of the cover 29. In addition, the lugs 52 have passed from the rim portion 45 carrying grooves 46 on the spool 37. Depressing the button 47 into the head 19 usually results in a slight movement of the spool 37 relative to the head 19. Under these conditions, the button member 47 can be released, since it cannot return to its outward station because the stepped surfaces 56 on the lugs 52 engage the rim portion 45 adjacent to the grooves. As a result, the line 21 can be manually pulled from the head 19 until the lugs 52 as ratchet teeth align with the next successive grooves 46B and 46D. Now, the spring 48 moves the button member 47 towards its outward station with the lugs 52 passing into the grooves 46B and 46D. However, the spool 37 has been rotated independently in the head 19 the angular displacement determined by the spacing (e.g., 90 degrees) of the grooves within the spool 47. This predetermined angular displacement determines the length of the cutting line 21 extended from the head 19 for each movement of the button member 47 into the head 19. If desired, the cutting line 21 can be extended by starting rotation of the head 19. The centrifugal force upon the line 21 will pull it outwardly and rotate the spool 37 that predetermined angular displacement to align the next successive grooves with the lugs 52. At this point, the spring 48 returns the button member 47 to its outward station and automatically locks the spool 37 against rotation within the head 19.

As best seen in FIGS. 6 and 7, the exterior side surfaces of the lugs 52 have a stepped configuration. A bottom step adjacent the button member 47 provides a guide surface 61 during axial movement in the round central opening within the cover 29. The intermediate surface 62 provides the stepped surfaces 56. The surfaces 56 rest against the inner planar surface of the cover 29 so that the spring 48 cannot push the button member 47 from the cover 29. The enlarged projecting ends of the lugs 52 are received in grooves 46A–D to selectively secure the spool 37 against unintended rotation relative to the head 19. The button member 47, as well as the remainder of the head 19, can be manufactured from plastic material by molding. The plastic button member 47 has resilient lugs 52. These lugs can be compressed inwardly and inserted through the openings 51 within the cover 29. Now the lugs are released and spring outwardly so that the stepped surfaces 56 will abut the inner surface of the cover 29 and keep the button member 47 within the head 19.

The button member 47 may be arranged to conform with the lower surface 36 of the cover 29. In this manner, the cutting line 21 rests most directly against the vegetation to be cut. The button 47, with the head 19 in a non-rotating condition, is depressed by the user's thumb or by pressing it against a suitable projection upon the earth's surface or other place when desired to feed line from the head.

The arrangement of the lugs 52 as the locking system between the spool 37 and the head 19 have additional advantages. During rotation of the head 19, a suitable length of cutting line 21, (e.g. seven inches), exerts a pull by centrifugal force of about five pounds upon the spool 37 to induce its rotation relative to the head 19. This force is amplified by the radius of the spool 37. The resultant force is applied radially by the lugs 52 in the grooves and openings 51. As a result, sufficient force is exerted by the lugs 52 that the button member 47 cannot be unintentionally depressed to the second station to release the spool 37 to feed an additional length of cutting line 21 from the head 19. A significant safety feature is provided where the head 19 must be substantially at non-rotating conditions before the button member 47 can be depressed so that no unexpected extension of cutting line 21 from the head 19 can occur.

An opening 57 is provided centrally of the button member 47. Preferably, the button member 47 is circular and mounted concentrically in the surface 36 of the cover 29. As a result, the opening 57 aligns with the end of the screw 41 for ready engagement by a suitable tool. Unthreading of the screw 41 from the adapter 26 allows the cover 29 and spool 37 to be removed from the hub 28. With this disassembly, additional line 21 can be coiled about the spool 37. If desired, a new spool 37 with a fresh supply of the cutting line 21 is installed in hub 28 and the head 19 reassembled. Proper alignment of the cover 29 upon the hub 28 is provided by complementary lugs and recesses 58. In this manner, the head 19 is very conveniently arranged for useful service and provides a high degree of safety to the user since he cannot accidentally induce the head 19 to undergo a condition where the cutting line 21 would be unintentionally extended during operation in cutting vegetation or otherwise.

Although the head 19 has been shown in a particular configuration, it may be formed in any suitable arrangement for affecting the cutting of vegetation. Preferably, the head 19 is disc-like and has a smooth peripheral surface in which aperture 31 is formed.

As a practical example of the apparatus for cutting vegetation in accordance with this invention, the head 19 was constructed substantially as shown in FIGS. 3, 4 and 5. The spool had a diameter of about $3\frac{1}{4}$ inches with four equally spaced grooves formed in rim portion 45 on its interior surface 44. The button member 47 had a pair of diametrically oppositely positioned lugs 52. With this arrangement, actuation and release of the button 47 to the inward station allows the spool 37 to rotate 90 degrees relative to the head 19. Depending upon the depth of the coils 38 upon the spool 37, the cutting line 21 was extended between approximately $1\frac{1}{2}$ and $2\frac{1}{2}$ inches by the 90-degree angular displacement of the spool 37 relative to the head 19. In addition, the button member 47 conformed to the smooth surface 36 of the cover 29. Debris, such as vegetation, could not collect between the button member 47 and cover 29. Test use of this head 19 showed the present invention to be a desirable, safe and practical device for effecting deliberate extension of the cutting line 21, in a certain predetermined length, from the head 19.

From the foregoing description, it will be apparent that there has been described a novel apparatus for cutting vegetation which is particularly arranged for selectively feeding additional lengths of cutting line from the head 19 into the cutting plane. It will be understood that certain changes and alterations in the present apparatus may be made without departing from the spirit of this invention. These changes are contemplated by and are within the scope of the appended claims which define the invention. Additionally, the present description is intended to be taken as an illustration of the invention.

What is claimed is:

1. An apparatus for cutting vegetation, comprising:
   (a) a circular head rotatable about an axis of rotation with a drive connection extending from a first face and a second face having a smooth surface free of projections and recesses capable of trapping appreciable vegetation and said second face in contact with vegetation being cut;
   (b) a spool carried by said head between said first and second faces and mounted for rotation independently thereof;
   (c) a flexible non-metallic cutting line having a first end extending radially outwardly of said head into a cutting plane residing substantially perpendicular to the axis of rotation of said head;
   (d) said cutting line having a second end secured to said spool and a supply of said cutting line coiled on said spool;
   (e) locking means on said head and adjusted between first and second positions by an actuating member conforming to said smooth surface of said second face and moving coaxially within said head along the rotational axis, said actuating member carried on the second face of said head for rotation therewith, said locking means in a first position securing said spool against rotation relative to said head and in a second position releasing said spool to rotate freely through a predetermined angular displacement and thereby extend a certain length of cutting line from said head into the cutting plane whereat said locking means are returned to the first position; and (f) and said actuating member is a button movable manually axially within said second face of said head.

2. The apparatus of claim 1 wherein said button is movable axially inwardly within said second face and bias means return said button into a station adjacent the smooth surface of said second face.

3. The apparatus of claim 1 wherein said locking means include projections and recesses on said spool and head forming ratchet means which permit said spool to rotate a predetermined angular displacement when said locking means is adjusted between said first and second positions.

4. The apparatus of claim 3 wherein said projections and recesses forming said ratchet means permit said spool to rotate through said angular displacement with said locking means in the second position, and upon said spool completing its rotation, the locking means are returned to the first position.

5. The apparatus of claim 4 wherein said spool carries a plurality of recesses disposed at a uniform angular spacing thereon and said locking means comprises projections carried by said head and in the first position engaging at least one recess to secure said spool against rotation relative to said head and said projections being moved out of said recesses in the second position so that the spool is rotatable relative to said head.

6. An apparatus for cutting vegetation, comprising:
(a) a circular head rotatable about an axis of rotation with a drive connection extending from a first face and a second face having a smooth surface free of projections and recesses capable of trapping appreciable vegetation and said second face in contact with vegetation being cut;
(b) a reel-type spool mounted concentrically within said head between said first and second faces and independently rotatable therein about the axis of rotation;
(c) a flexible non-metallic cutting line coiled on said spool and having a free end extending outwardly of said head into a cutting plane;
(d) locking means adapted to be activated manually said head in a non-rotating condition by a button member carried by said head for rotation therewith and said button member having a planar surface conforming to said second face and moving coaxially with the rotational axis in said second face for releasing said spool for rotation freely through a predetermined angular displacement within said head to thereby extend a certain length of said cutting line from said head into the cutting plane whereat said spool is secured against rotation relative to said head; and
(e) said button member is circular and mounted concentrically in said head for movement axially therein to release said spool for rotation.

7. The apparatus of claim 6 wherein bias means return said button member into alignment with the adjacent parts of said smooth surface of said second face of said head after said spool has rotated to extend the certain length of cutting line into the cutting plane.

8. The apparatus of claim 6 wherein said locking means includes ratchet means operatively connected to said button member, said button member mounted in said head for movement axially into said head for releasing said spool to rotate within said head, and bias means associated with said button member to return same axially to an outward station to secure said spool against rotation after the certain length of cutting line is extended from said head into the cutting plane.

9. The apparatus of claim 8 wherein said ratchet means permit said spool to rotate over a certain prescribed angular displacement after said button member is moved axially into said head, and upon said spool completing its rotation, the button member is returned to the outward station.

10. The apparatus of claim 8 wherein said ratchet means are adapted to release said spool for rotation when said button member is moved axially into said head when in a non-rotating condition.

11. The apparatus of claim 10 wherein said ratchet means are adapted to permit said spool to complete its rotation and the button member to return to the outward station upon rotation of said head.

12. An apparatus for cutting vegetation, comprising:
(a) a cylindrical-shaped head rotatable about an axis of rotation, said head having a circular periphery and an end face forming a smooth planar surface in contact with vegetation being cut and carrying concentrically a non-projecting circular button member adapted for manually induced axial movement from an outward station to an inward station into said head against a biasing force;
(b) a reel-type spool mounted concentrically within said head and independently rotatable therein, and said spool being totally enclosed within said head;
(c) a flexible non-metallic cutting line coiled on said spool and having a free end extending outwardly through an aperture in the circular periphery of said head and into a cutting plane
(d) ratchet means controlled by axial movement of said button member within said head in a non-rotating condition to permit said spool to rotate freely within said head over a predetermined angular displacement thereby extending only a certain length of said cutting line from said head into the cutting plane responsively to a radial directed manual pull upon the free end of said cutting line and
(e) said circular button member is restricted by camming surfaces from manually induced axial movement into head while said head is rotated at operative angular velocities.

13. The apparatus of claim 12 wherein movement of said button member axially into said head permits said spool to rotate, and return of said button member to the outward station terminates rotation of said spool within said head.

14. An apparatus for cutting vegetation, comprising;
(a) a cylindrical-shaped head rotatable about an axis of rotation, formed by integrally interfitted hub and cover, said head having a circular periphery and an end face and said cover forming a smooth planar surface in contact with vegetation being cut, and said cover carrying concentrically a non-projecting circular button member adapted for manually induced axial movement from an outward station to an inward station into said head against a biasing force, but with said button secured to said cover for rotation in unison with said
(b) a reel-type spool mounted concentrically within a cavity formed in said head and independently rotatable therein about the rotational axis, and said spool being totally enclosed within said head and secured against axial movement by said hub and cover;

(c) a flexible non-metallic cutting line coiled on said spool and having a free end extending outwardly through an aperture in the circular periphery of said head and into a cutting plane;

(d) said spool provided with an interior axial surface carrying radial inward projections of thin axial dimension and separated angularly on said surface, and said projections separated by axial grooves;

(e) said button member carrying axial lugs mounted in said cover in a coaxial cylindrical wall carrying sidewall openings whereby said button member is adapted for axial movement between the outward and inward stations but is secured to said cover for rotation in unison with said head;

(f) said lugs on said button member carrying terminal camming surfaces adapted to interfit slideably in said grooves between said projections on said spool;

said button member in the outward station axially positions said camming surfaces in said grooves between said projections on said spool whereby said spool is secured against rotation relative to said head; and (h) said button in the inward station axially positions said camming surfaces through said grooves out of between said projection on said spool whereby said spool is released to rotate relative to said head and cutting line is extended from said head into the cutting plane responsive to a radially directed manual pull upon the free end of the cutting line.

15. The apparatus of claim 14 wherein said circular button member is restricted by said camming surfaces from manually induced axial movement into head while said head is rotated at operative angular velocities.

16. The apparatus of claim 15 wherein movement of said button member axially into said head at said inward station permits said spool to rotate, and return of said button member into the outward station automatically terminates rotation of said spool within said head.

17. The apparatus of claim 14 wherein said circular button member is free for manually-induced axial movement into said head while in a non-rotating condition.

* * * * *